United States Patent [19]

Matheson

[11] Patent Number: 4,472,101
[45] Date of Patent: Sep. 18, 1984

[54] APPARATUS FOR MOVING IRRIGATION PIPELINE SECTIONS

[76] Inventor: Clarence H. Matheson, P.O. Box 6, Snelling, Calif. 95369

[21] Appl. No.: 382,160

[22] Filed: May 26, 1982

[51] Int. Cl.³ .................................................. B66F 19/00
[52] U.S. Cl. ..................................... 414/747; 414/745
[58] Field of Search ................ 414/745, 748, 910, 747

[56] References Cited

U.S. PATENT DOCUMENTS

| | | | |
|---|---|---|---|
| 2,818,182 | 12/1957 | Goesch | 414/747 |
| 2,996,197 | 8/1961 | Smeal | 414/747 |
| 3,082,883 | 3/1963 | Smeal | 414/745 |
| 3,550,790 | 12/1970 | Noble | 414/747 |
| 3,561,613 | 2/1971 | Moad | 414/728 |

FOREIGN PATENT DOCUMENTS

1147098 4/1969 United Kingdom ................ 414/747

Primary Examiner—Robert J. Spar
Assistant Examiner—Janice Krizek
Attorney, Agent, or Firm—Donald A. Kettlestrings

[57] ABSTRACT

Apparatus for transferring a sprinkler irrigation pipeline section laterally with respect to the pipeline from a first position to a second position. A boom is rotatably mounted on a towable wheeled vehicle and a conveyor is supported by the boom for conveying pipeline sections in a lateral direction from a second or loading end of the boom to a first or unloading end of the boom. A hydraulic motor is connected for operating a conveyor, and controls are located in operative relationship with the hydraulic motor and adjacent the first and second ends of the boom for controlling movement of the conveyor and transfer of the pipeline section.

28 Claims, 12 Drawing Figures

APPARATUS FOR MOVING IRRIGATION PIPELINE SECTIONS

This invention relates to pipe moving apparatus, and more particularly to apparatus for transferring sprinkler irrigation pipeline sections laterally with respect to the pipeline.

Irrigation of agricultural fields is frequently accomplished by sprinkler pipeline sections coupled together to define an irrigation pipeline which extends across the field. To irrigate the entire field, it is necessary to periodically move the pipeline laterally, with respect to the pipeline's length, a distance approximately equal to the width of the area which can be irrigated by the sprinkler heads. The pipeline must often be moved many times in order to irrigate the entire field.

In the past, movement of the irrigation pipeline sections has been accomplished by the manual labor of many men. More recently, a number of different types of pipe moving machines have been developed to reduce the number of men required to perform the relocation of the pipeline and to speed up such movement. Although the previously known pipe moving machines have adequately served their purposes, they have not proved entirely satisfactory under all conditions of service for a variety of reasons.

It is, therefore, an object of the present invention to provide apparatus for transferring sprinkler irrigation pipeline sections laterally with respect to the pipeline wherein a single attendant can control the apparatus to cause the pipeline section to be moved laterally from an existing pipeline position to a new pipeline position.

Another object is to provide such an apparatus which can be used to transfer pipeline sections of different lengths.

A further object of the invention is the provision of such apparatus which has a relatively high ground clearance and which is free of sprockets, chains and other elements near ground level which might become entangled in crops.

Still another object is to provide such an apparatus which is towable by a conventional tractor or other towing vehicles and which is relatively simple in construction and operation when compared to other known pipe moving machines.

Yet another object of the present invention is the provision of such an apparatus wherein uncoupling, transfer, and recoupling of the pipeline sections can be accomplished by three men.

A still further object of the invention is the provision of such apparatus wherein the pipeline sections upon transfer to their new positions will be automatically rotated so that the risers and sprinkler heads will be in upright positions.

Another object is to provide such apparatus wherein the men operating the apparatus can work at a pace set by them and not by the machine.

A further object of the invention is the provision of such apparatus which is relatively lightweight.

Still another object is to provide such apparatus wherein the tractor or towing vehicle is laterally offset from the center axis of the apparatus whereby the tractor avoids wet ground which has been already irrigated.

A still further object is to provide such apparatus which is operated by a single attendant to automatically transfer a pipeline section from the loading end of the apparatus to the unloading end where the pipeline carriage of the apparatus then automatically returns to the loading end to receive another pipeline section from the attendant.

Additional objects and advantages of the invention will be set forth in part in the description which follows, and in part will be obvious from the description, or may be learned by practice of the invention.

The objects and advantages are realized and attained by means of the instrumentalities and combinations particularly pointed out in the appended claims.

To achieve these and other objects the present invention provides apparatus for transferring a sprinkler irrigation pipeline section laterally with respect to the pipeline from a first position to a second position, comprising: a wheeled vehicle, a boom rotatably mounted adjacent a first end of the boom on the vehicle and the boom extending outwardly from the vehicle to define a second end of the boom, conveying means supported by the boom for conveying the pipeline section in a lateral direction from the second end to the first end of the boom, means in operative relationship with the conveying means for operating the conveying means, first control means mounted adjacent the second end of the boom and in operative relationship with the operating means for selectively enabling initiation of movement of the conveying means in a first predetermined direction to convey the pipeline section from the second to the first end of the boom, second control means mounted adjacent the first end and in operative relationship with the operating means to control operation thereof and positioned to be physically contacted and moved by a predetermined portion of the conveying means to cause cessation of movement of the conveying means, ramp means mounted adjacent the first end of the boom and in operative relationship with the conveying means for receiving the pipeline section from the conveying means upon the cessation of movement of the conveying means and for guiding the section to the ground, third control means in operative relationship with the operating means to control operation thereof and positioned adjacent the ramp means to be physically contacted by the pipeline section as the section moves downwardly along the ramp means for initiating movement of the conveying means in a second predetermined direction opposite to the first direction, and wherein the first control means is positioned to be physically contacted by a predetermined portion of the conveying means as that portion of the conveying means approaches the second end of the boom and for causing cessation of movement of the conveying means.

Preferably, the vehicle includes means mounted on the vehicle adjacent the first end of the boom for engaging a sprinkler riser portion of the pipeline section as the section moves downwardly off the ramp means and for causing the pipeline section to rotate substantially about its own axis whereby the riser portion is in an upright position as the pipeline section falls to the ground.

In accordance with the invention, the vehicle further preferably includes a means for connecting the vehicle to another self-propelled towing vehicle, such as a tractor. Preferably, the hitch means includes structural means extending laterally with respect to the wheeled vehicle for enabling attachment of the self-propelled towing vehicle to the hitch means in a position laterally offset with respect to the wheeled vehicle. The wheeled vehicle also preferably includes caster wheels at the forward end of the wheeled vehicle.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, to serve to explain the principles of the invention.

With reference now to the drawings, wherein like reference characters designate like or corresponding parts throughout the several views, there is shown apparatus 20 in accordance with this invention for transferring a sprinkler irrigation pipeline section laterally with respect to the pipeline from a first position to a second position. Apparatus 20 includes a wheeled vehicle 22, and a boom 24 rotatably mounted adjacent to a first end 26 of the boom on vehicle 22. Boom 24 extends outwardly from vehicle 22 to define a second end 28.

Conveying means 30 are supported by boom 24 for conveying pipeline section 32 in a lateral direction from second end 28 of the boom to first end 26. Means 34 are provided in operative relationship with conveying means 30 for operating the conveying means.

First control means 36 (see FIG. 4) are mounted adjacent second end 28 of boom 24 and in operative relationship with operating means 34 for selectively enabling an initiation of movement of conveying means 30 in a first predetermined direction to convey pipeline section 32 from second end 28 to first end 26 of boom 24.

Second control means 38 are mounted adjacent first end 26 of boom 24 and in operative relationship with operating means 34 to control operation of operating means 34. Control means 38 are also positioned to be physically contacted and moved by a predetermined portion 40 of conveying means 30 to cause cessation of movement of the conveying means.

Ramp means 42 are mounted adjacent first end 26 of the boom and in operative relationship with conveying means 30 for receiving pipeline section 32 from conveying means 30 upon the cessation of movement of the conveying means, and ramp means 42 guide pipeline section 32 to the ground.

Third control means 44 are located in operative relationship with operating means 34 to control operation of operating means 34, and control means 44 are positioned adjacent ramp means 42 to be physically contacted by pipeline section 32 as the section moves downwardly along ramp means 42 for initiating movement of conveying means 30 in a second predetermined direction opposite to the first direction.

First control means 36 are also positioned to be physically contacted by portion 40 of conveying means 30 as the portion 40 approaches second end 28 of the boom for causing cessation of movement of conveying means 30.

Vehicle 22 preferably includes means 46 mounted on the vehicle and adjacent first end 26 of the boom for engaging a sprinkler riser portion 48 of pipeline section 32 as the section moves downwardly along ramp means 42 and for causing pipeline section 30 to rotate substantially about its own axis whereby riser portion 48 is in an upright position as pipeline section 32 falls to the ground.

Vehicle 22 further includes hitch means 50 for connecting the vehicle to another self-propelled towing vehicle, such as a tractor (not shown). Hitch means 50 perferably include structural means 52 extending laterally with respect to the vehicle for enabling attachment of the self-propelled towing vehicle or tractor to hitch means 50 in a position laterally offset with respect to vehicle 22.

Vehicle 22 further includes caster wheels 54 at the forward end of the vehicle, and the vehicle further includes frame members 56 connected together to define a substantially rectangular frame assembly. Supporting wheels 58 are attached at the rear of the frame assembly, and turntable track members 60 are also connected to the frame assembly.

Boom 24 preferably includes first and second structural support members 62, 62' positioned in substantially parallel relationship with each other adjacent to and at first end 26 of the boom. Brace members 64 are connected between first and second support members 62, 62', and rollers 66 are attached at predetermined locations to first and second support members 62, 62' and are postioned to rest on turntable track members 60.

Boom 24 further includes a plurality of additional support members 68 connected to, and in structurally supporting relationship with, support members 62, 62' and with brace members 64. First and second substantially parallel conveying track members 70, 70' are supported by support members 68 and extend in substantially inverted v-shaped configurations between first end 26 and second end 28 of boom 24.

Conveying means 30 include a drive shaft 72 rotatably mounted on boom 24 and adjacent first end 26 of the boom. A drive pully 74 is fixedly attached to shaft 72 and is connected in operative relationship to operating means 34 by means of belt 76 to be rotated by operating means 34. First and second conveyor pulleys 78, 78' are fixedly mounted on shaft 72. First and second idler pulleys 80, 80' are mounted on boom 24 adjacent to second end 28 of the boom, and additional idler pulleys 82, 82' are mounted on the boom by means of shaft 84 adjacent to apex 86 of conveying track members, 70, 70'. Additional idler pulleys may also be mounted on the boom as required.

A first endless cable 88 is mounted on first conveyor pulley 78. Endless cable 88 also extends around first idler pulley 80 and is supported by idler pulley 80 and predetermined ones of additional idler pulleys (not shown). A second endless cable 88' is mounted on second conveyor pulley 78', and endless cable 88' extends around idler pulley 80' and is supported by additional idler pulley 82' and predetermined ones of other idler pulleys (not shown). Means 90 are provided in operative relationship with cables 88, 88' for maintaining the cables under predetermined tensions. Means 90 may include spring-loaded idler pulleys 91, 91'. A pipeline section carriage assembly 92 is attached to endless cables 88, 88' and is positioned to support pipeline section 32 above conveying track members 70,70'.

In accordance with the invention, operating means 34 preferably include a hydraulic motor 94 mounted on boom 24 and adjacent first end 26 of the boom. Operating means 34 also include a hydraulic control valve 96 mounted on boom 24 adjacent first end 26 thereof and in operative relationship with hydraulic motor 94 to control operation of the motor. Operating means 34 also include a control valve arm 98 connected in operative relationship with control valve 96 for controlling operation of the control valve.

First control means 36 include a first manually operated member 100 and a first control cable 102 connected between manually operated member 100 and control valve arm 98.

Second control means 38 include a second control member 104 rigidly connected to control valve arm 98 by means of bar 106 and positioned between conveying track members 70, 70' with a portion of control member 104 projecting upwardly and above conveying track members 70, 70' to enable physical contact and movement of control member 104 by carriage assembly 92.

Ramp means 42 include first and second guide members 108, 108' attached, respectively, to first and second conveying track members 70, 70'. Ramp means 42 further include first and second wedge-shaped ramp members 110, 110' attached, respectively, to the upper portions of first and second conveying track members 70, 70'. Ramp members 110, 110' are aligned, respectively, with guide members 108, 108' to provide substantially continuously downwardly sloped ramp surfaces 112, 112' for directing pipeline section 32 downwardly towards the ground.

Third control means 44 preferably include a third control member 114 positioned between ramp members 110, 110'. Control member 114 is rotatably attached to boom 24 to normally project upwardly and above ramp members 110, 110' and to enable physical contact and rotational movement of control member 114 by pipeline section 32 as the pipeline section slides downwardly along ramp surfaces 112, 112'.

Third control means 44 further include a first freely rotatable wheel member 116 connected to control valve arm 98 by bar 106 and positioned to be contacted and moved by control member 114 when control member 114 is contacted and rotated downwardly by pipeline section 32. Such movement of bar 106 moves control valve arm 98 and initiates movement of conveying means 30 in the second predetermined direction from first end 26 of the boom toward second end 28.

Third control means 44 also include a first spring 118 connected between control member 114 and one of brace members 64 for normally maintaining control member 114 in an upwardly projecting position above the surface of an imaginary plane passing through ramp surfaces 112, 112'.

Control member 114 preferably includes a second freely rotatable wheel member 120 positioned to rotatably contact first wheel member 116 when control member 114 is contacted and rotated downwardly by pipeline section 32 whereby the contact of wheel members 116 and 120 causes movement of control valve arm 98 to a position which initiates movement of conveying means 30 in the second predetermined direction from first end 26 of the boom toward the second end 28.

A second spring 122 is connected to control valve arm 98 and extends toward first end 26 of the boom to be connected to one of brace members 64 for normally biasing control valve arm 98 toward first end 26 of the boom.

Figure 6:
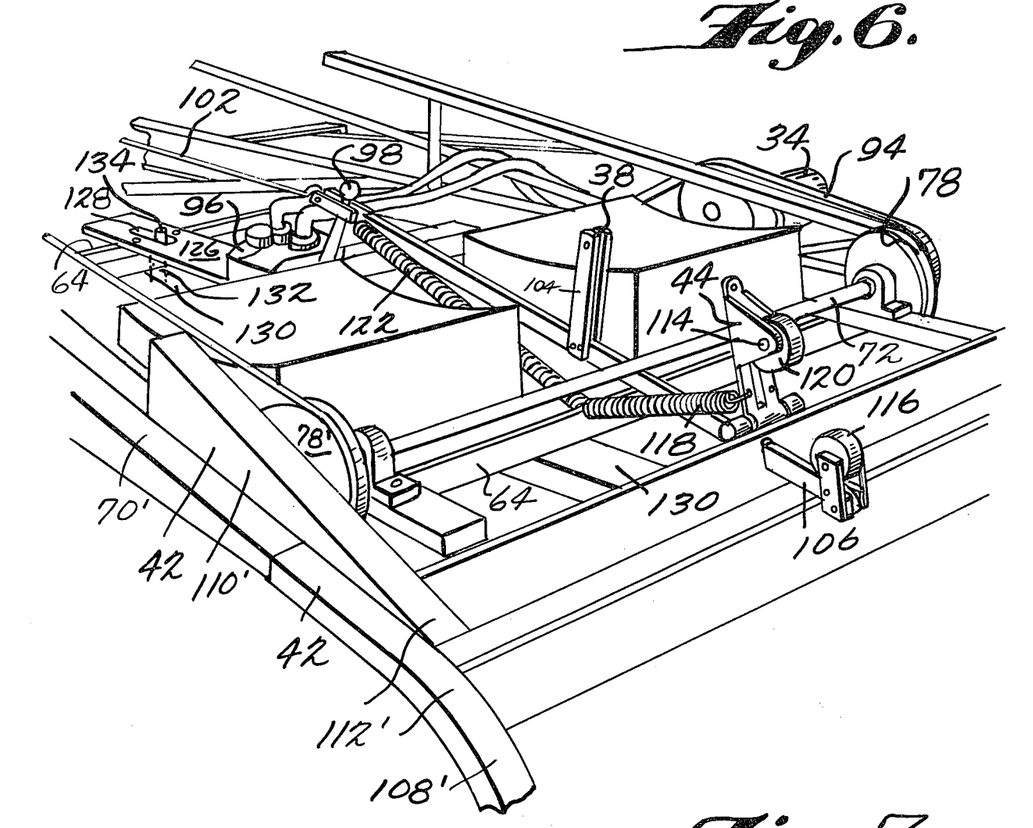
FIG. 6 is a fragmentary perspective view of the apparatus showing the unloading end of the boom.
Figure 7:
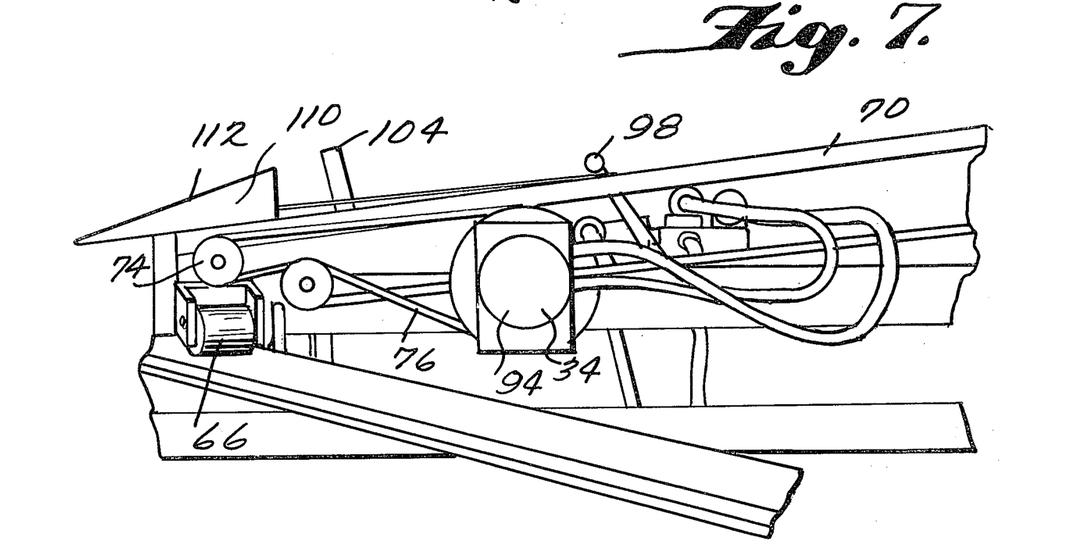
FIG. 7 is a fragmentary side elevation view of the unloading end of the boom.

Apparatus 20 includes means 124 in operative relationship with vehicle 22 and with boom 24 for locking the boom into predetermined positions with respect to the vehicle. More specifically, locking means 124 includes a lock plate 126 attached to a predetermined one or ones of brace members 64 and defining a pin-receiving opening 128. Vehicle 22 provides for at least one support 130 attached to and extending between frame members 56 and wherein vehicle support 130 defines a pin-receiving opening 132 (FIG. 6) aligned with opening 128. A locking pin 134 is provided and it is placed through openings 128 and 132 to lock boom 24 into position on vehicle 22.

Figure 1:
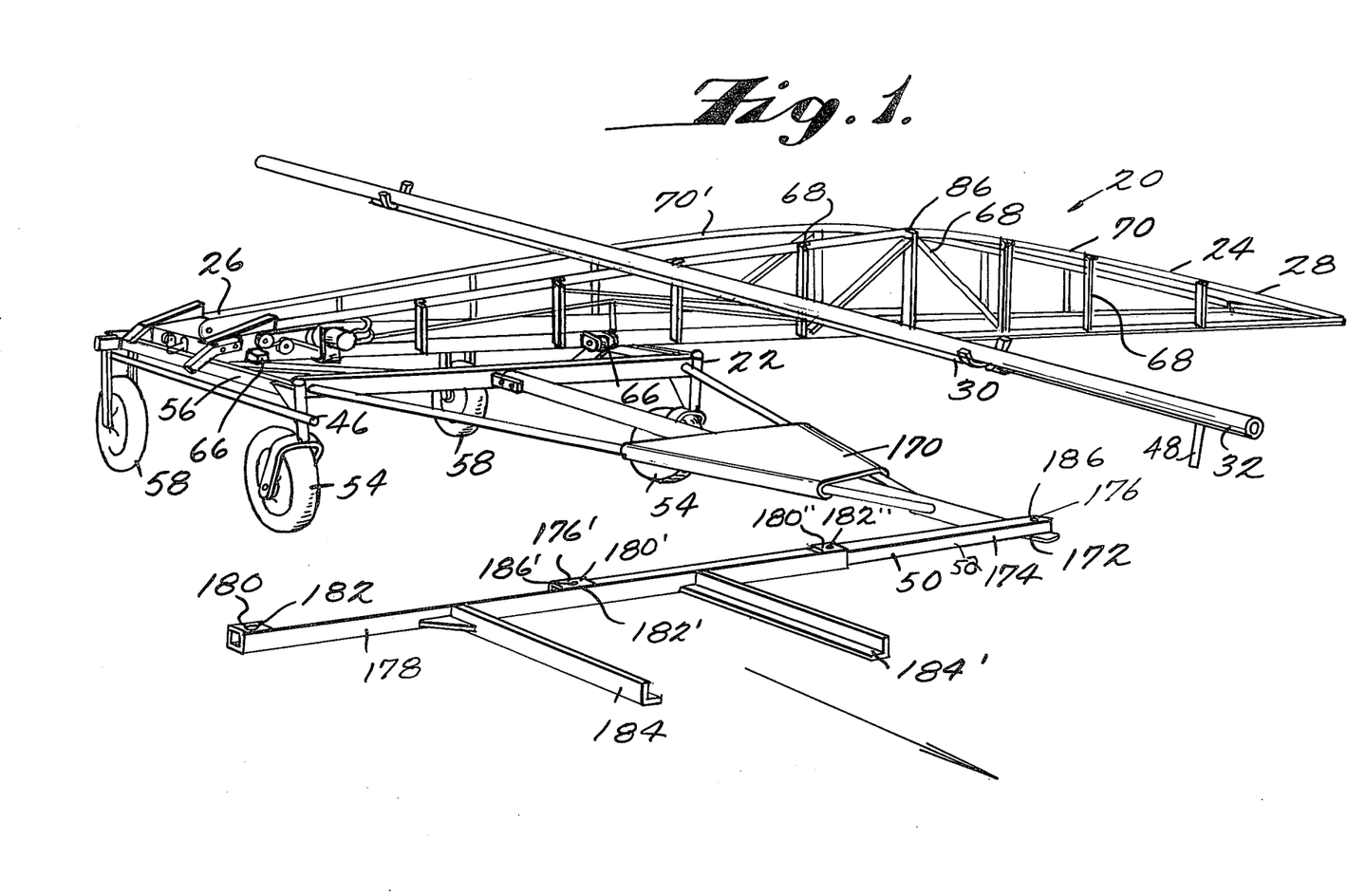
FIG. 1 is a perspective view of the apparatus with the boom oriented in an operating position to the left side of the wheeled vehicle.
Figure 2:
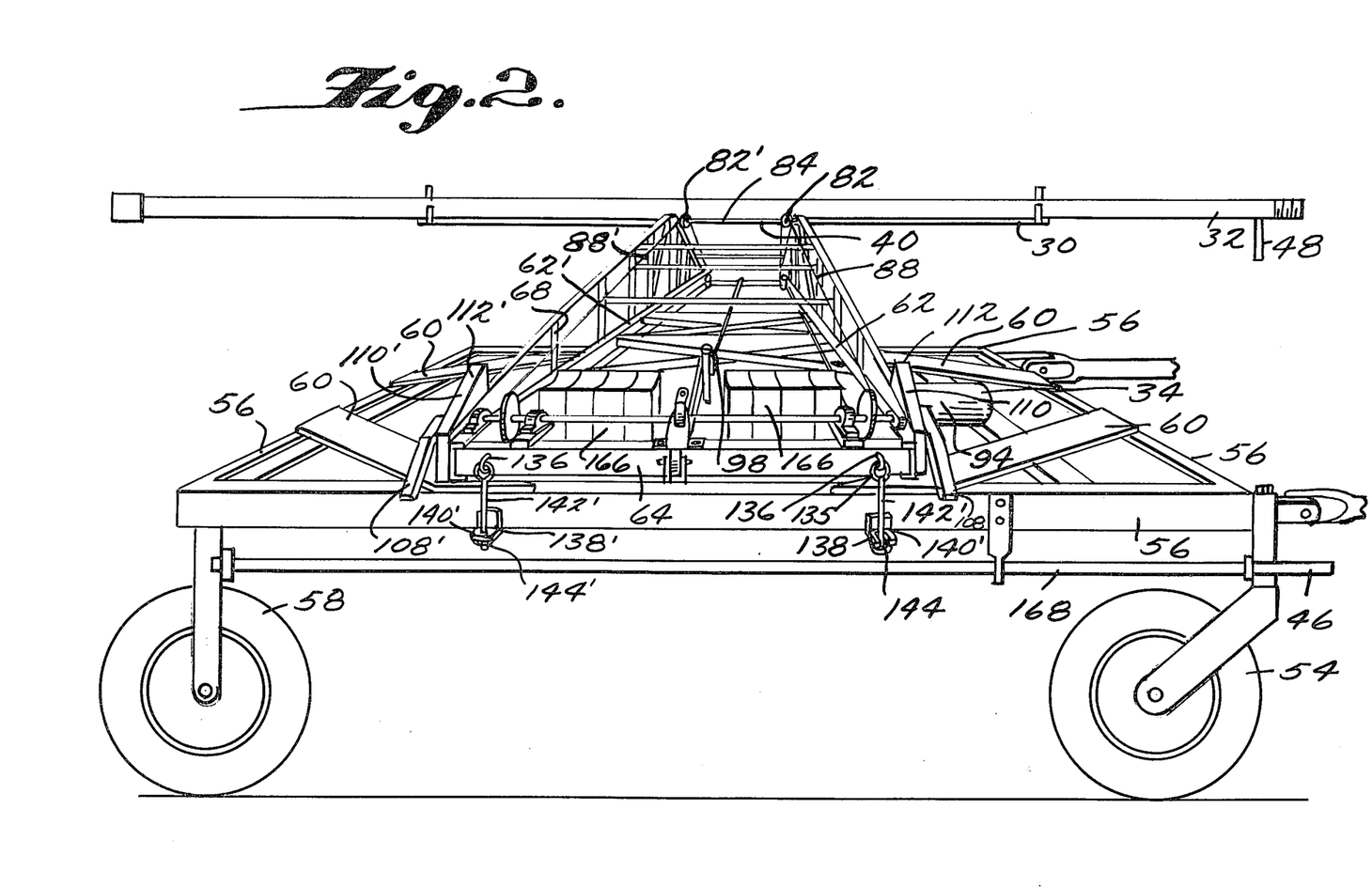
FIG. 2 is a fragmentary side perspective view of the apparatus viewed from the unloading end of the boom and with the boom in an operating position to the left side of the wheeled vehicle.
Figure 3:
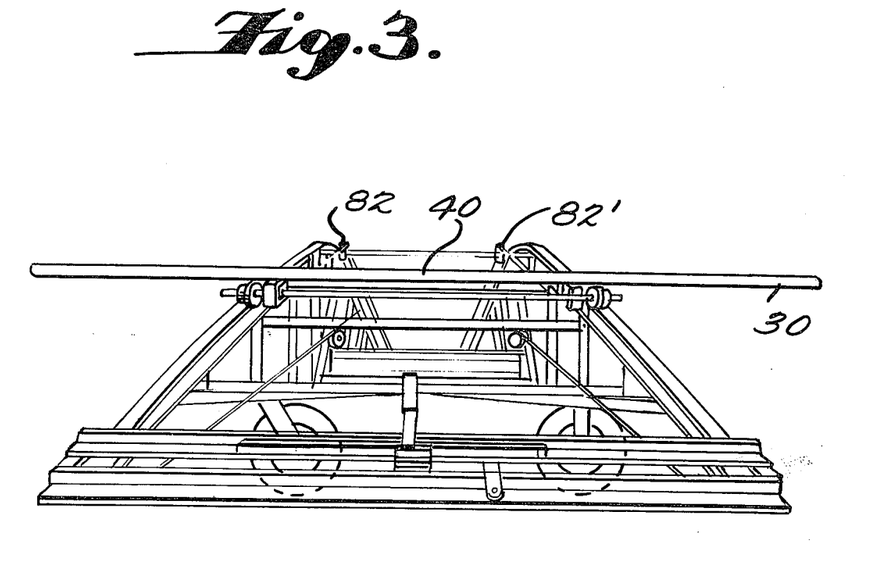
FIG. 3 is a fragmentary side perspective view of the apparatus viewed from the loading end of the boom and with the boom in an operating position to the left side of the wheeled vehicle.
Figure 5:
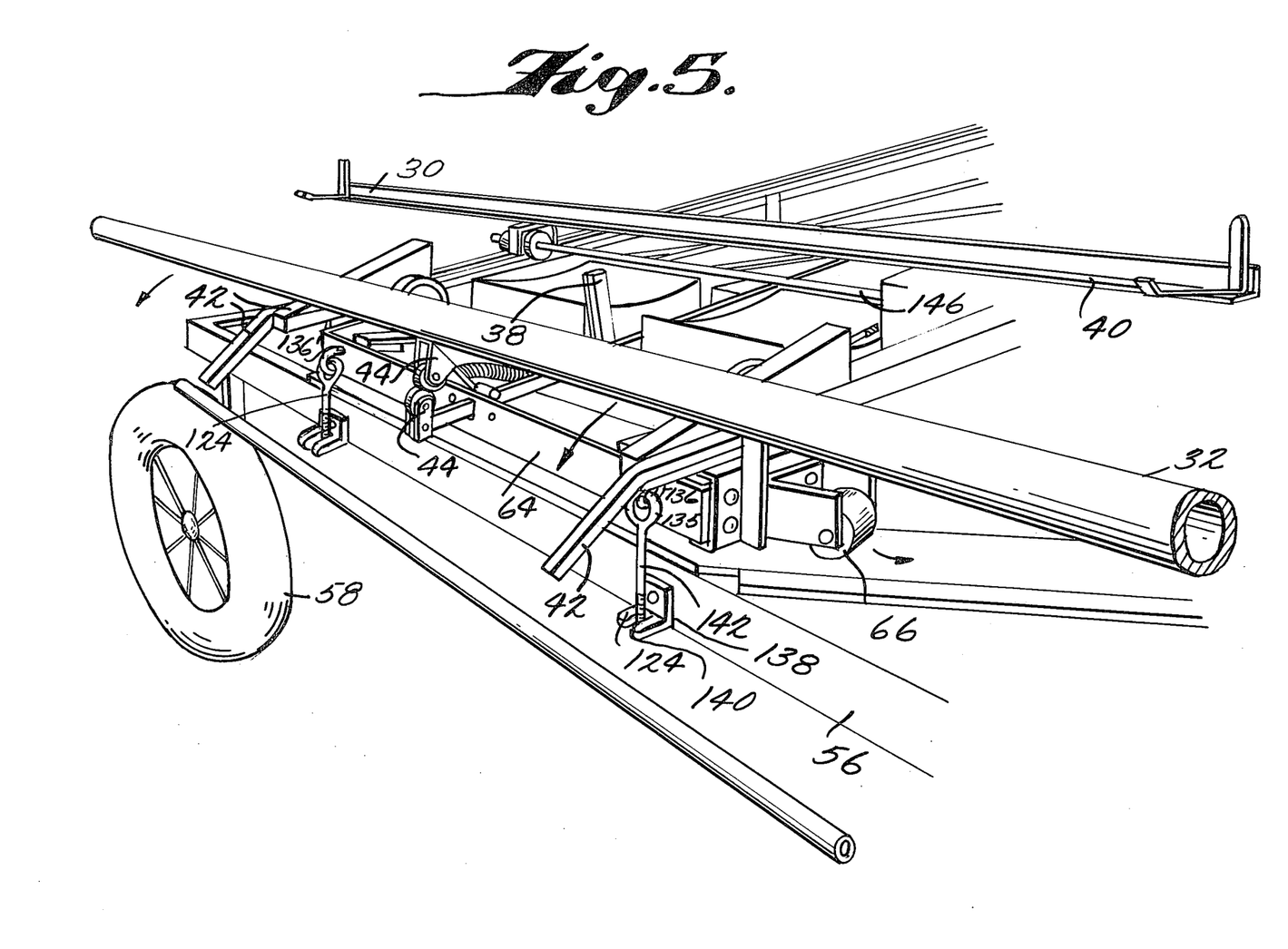
FIG. 5 is a fragmentary perspective view of the apparatus showing a pipeline section being dropped from the unloading end of the boom.

Locking means 124 also may include eyelets 136, 136' (FIGS. 2 and 5) attached to brace member 64 located at first end 26 of the boom. L-shaped brackets 138, 138' are attached to the front and side frame members 56 of vehicle 22, and each bracket 138 defines a slot 140', 140'. Elongated pin members 142, 142' are attached by means of eyelets 135, 135' located at one end of each of pin members 142, 142' to eyelets 136', 136'. The opposite ends of pin members 142, 142' are threaded for receiving wing nuts, 144, 144'. When boom 24 is properly positioned, wing nuts 144, 144' are threaded along pin members 142, 142' until the wing nuts or washers associated with the wing nuts contact brackets 138', 138'.

Figure 8:
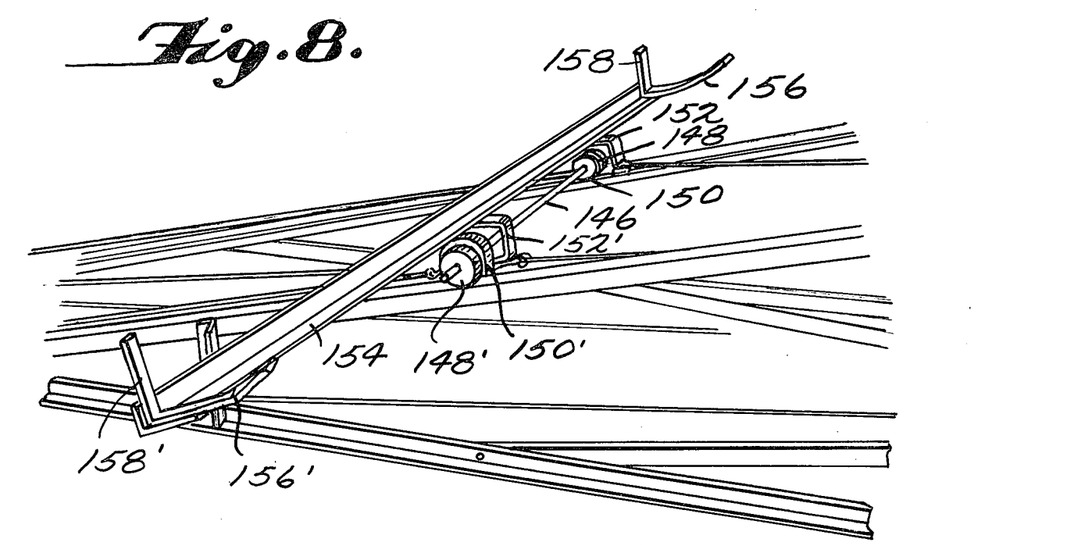
FIG. 8 is a fragmentary perspective view of the pipeline section carriage assembly and the boom.
Figure 9:
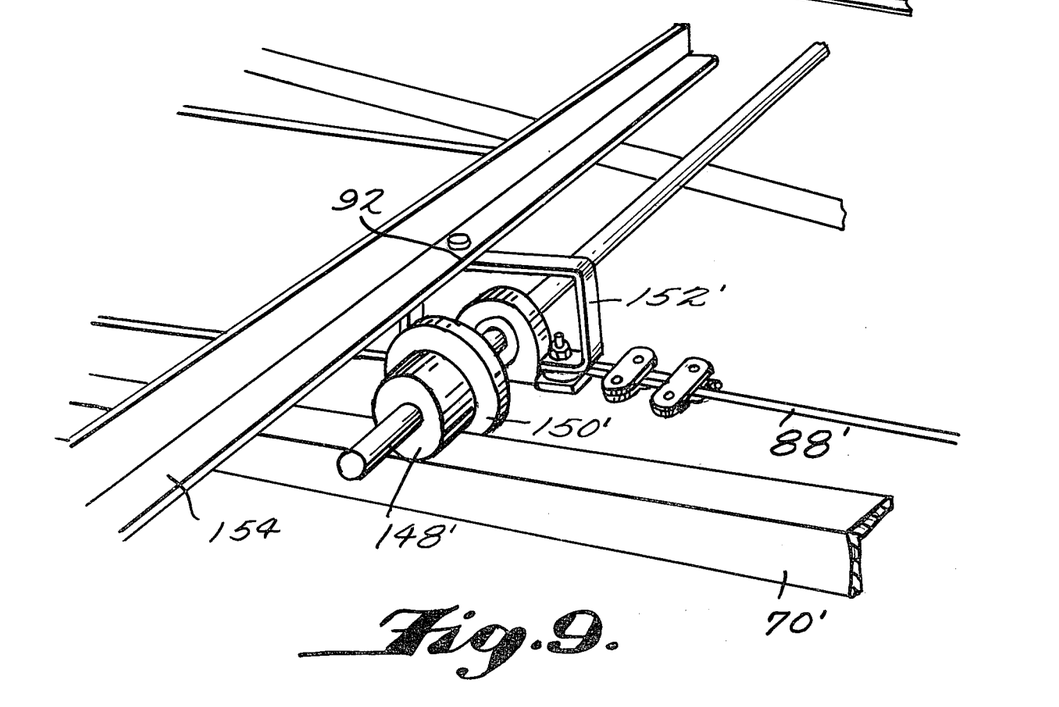
FIG. 9 is a more detailed fragmentary perspective view of the carriage assembly.
Figures 10, 11, 12:
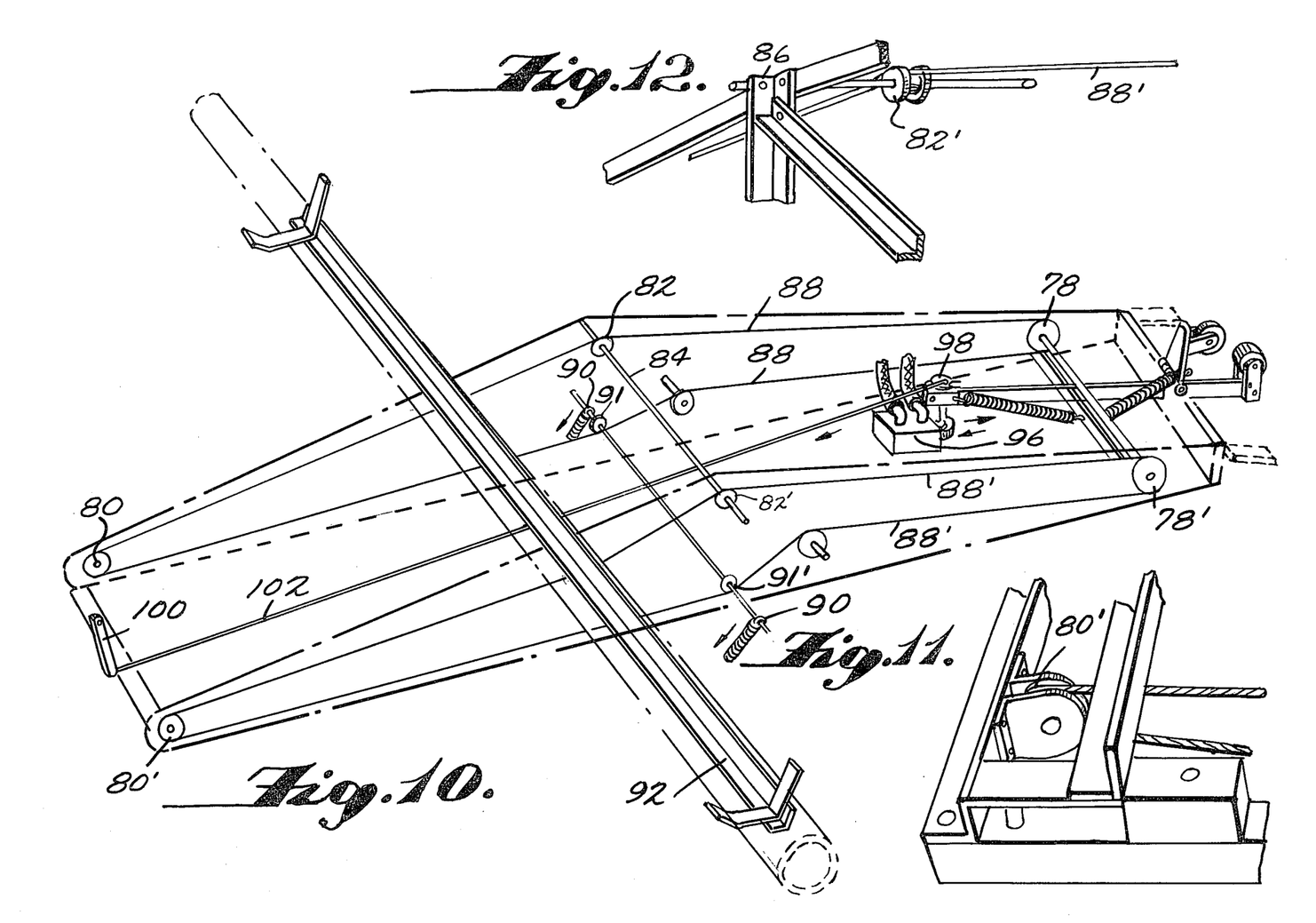
FIG. 10 is a diagramatic view illustrating operation of the apparatus of this invention.
FIG. 11 is a fragmentary perspective view of a portion of the loading end of the boom.
FIG. 12 is a fragmentary perspective view of a portion of the boom showing an idler pulley and an endless cable riding over the pulley.

Pipeline section carriage assembly 92 includes a carriage shaft 146 (see FIG. 8), and carriage wheels 148, 148' are rotatably mounted at each end of carriage shaft 146. Each of carriage wheels 148, 148' also rotatably rests on respective ones of conveying track members 70, 70' (see FIG. 9). Each of the carriage wheels define flanged portions 150, 150', respectively, for maintaining the carriage wheels on conveying track members 70, 70'. First and second bracket members 152, 152' are mounted on carriage shaft 146 and are respectively attached to endless cables 88, 88'. A pipeline section support 154 is mounted on bracket members 152, 152' and extends in substantially parallel relationship with respect to carriage shaft 146. Support 154 preferably includes pipeline section retaining members 156, 156' and 158, 158' for retaining pipeline section 32 in position on support 154 as carriage assembly 92 traverses conveying track members 70, 70'.

Figure 4:
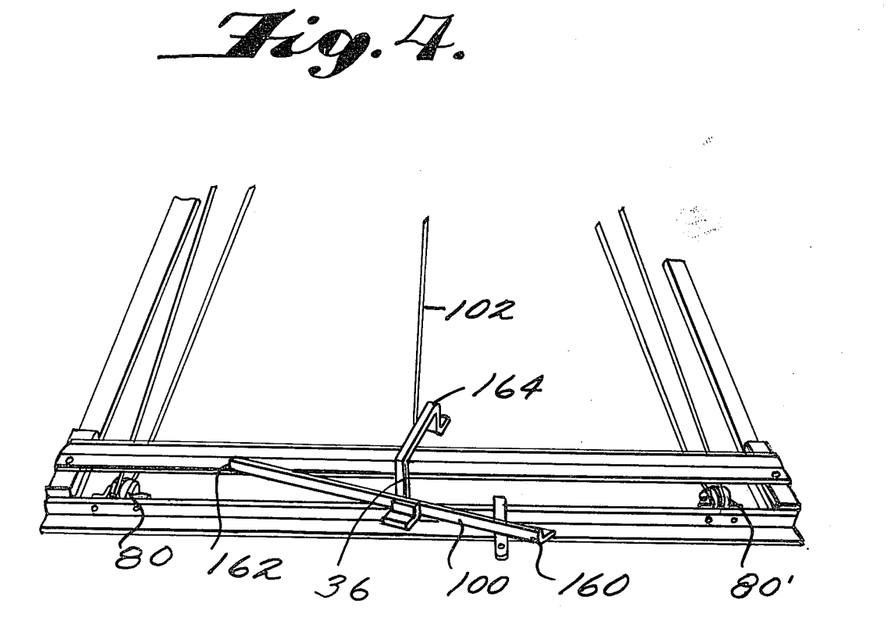
FIG. 4 is a fragmentary perspective view of the loading end of the boom.

In accordance with the invention, first control means 36 preferably includes a handlebar 160 (see FIG. 4)

rotatably attached to boom 124 at location 162 and attached to first control cable 102. A third bracket member 164 is attached to handlebar 160 and projects to a location between conveying track members 70, 70'. This enables bracket member 164 to be physically contacted and moved by portion 40 of conveying means 30 as portion 40 approaches second end 28 of the boom to cause rotational movement of handlebar 160 in a direction away from second end 28 and to cause tightening of control cable 102. Tightening of cable 102 causes movement of control valve arm 98 in a direction to cause cessation of movement of conveying means 30.

Counter weights 166 are mounted on boom 24 and adjacent first end 26 where necesssary to offset the weight of the boom and the weight of pipeline section 32.

Sprinkler riser engaging means 46 include extendable rod means 168 (see FIG. 2) which can be extended during use for engaging riser portions 48 of pipeline section 32 and which can be retracted when not in use.

Vehicle 22 defines forwardly extending tongue assembly 170 which defines a first pin-receiving opening 172. Structural means 52 of hitch means 50 include a first laterally extending support bar 174 defining second and third pin-receiving openings 176, 176' at the ends of the support bar. A second laterally extending support bar 178 defines open sleeve members 180, 180' and 180" at each end and at the center portion of support bar 178 for slidably receiving support bar 174 within the sleeve members. Sleeve members 180, 180' and 180" define fourth pin-receiving openings 182, 182' and 182", respectively.

Forwardly extending members 184, 184' are connected to support bar 178 for connecting hitch means 50 to the self-propelled vehicle (not shown). A first pin 186 extends through first pin-receiving opening 172 of tongue assembly 170 and through second pin-receiving opening 176 of support bar 174 for connecting hitch means 50 to tongue assembly 170. Second pin 186' extends through third pin-receiving opening 176' of support bar 174 and through fourth pin-receiving opening 182' of support bar 178 for holding support bar 178 in fixed position with respect to support bar 174.

It can readily be seen that hitch 50 can be attached to tongue assembly 170 so that hitch means extends laterally to the right or laterally to the left of the tongue assembly, as desired.

In operation, vehicle 22 is attached to a tractor or other towing vehicle by hitch means 50. Boom 24 is normally positioned to extend rearwardly of vehicle 22 when apparatus 20 is being towed to the field.

Prior to commencing transfer of the irrigation pipeline sections, locking pin 134 is removed and wing nuts 144 are loosened to permit pin members 142, 142' to be removed from bracket slots 140, 140'. Boom 24 is then manually rotated and rollers 66 move over turntable track members 60 until the boom extends laterally from the vehicle 22 in a direction toward the irrigation pipeline sections to be transferred. The boom is then locked into position by reinserting locking pin 134 and by positioning pin members 142, 142' into slots 140, 140' of brackets 138, 138' which are located on the side of vehicle 22 opposite from that side toward which the boom is projecting. Wing nuts 144, 144' are then tightened against brackets 138, 138'.

Apparatus 20 requires only three men for its operation. One man will be seated on the tractor or towing vehicle, a second man will be positioned adjacent to first or unloading end 26 of the boom, and a third man will be positioned adjacent to second or loading end 28 of the boom.

Pipeline section and carriage assembly 92 is moved over conveying track members 70, 70' until the carriage assembly is positioned adjacent to loading end 28 of boom 24. The man working adjacent to loading end 28 of the boom disconnects a pipeline section 32 from the irrigation pipeline. The tractor operator tows vehicle 22 to a position substantially midway along pipeline section 32. Pipeline section 32 is then manually lifted and placed onto carriage assembly 92, and retaining members 156, 156' and 158, 158' help to maintain pipeline section 32 in position on the carriage assembly.

The man adjacent to loading end 28 of the boom then pulls control means 36 so that handlebar 160 rotates about location 162 in a direction away from loading end 28 of the boom. This, in turn, causes a tightening of control cable 102 which causes rotation of control valve arm 98 in a direction toward loading end 28 of the boom.

The tractor or towing vehicle is conventionally provided with a hydraulic supply system which is hydraulically connected to hydraulic motor 94. Hydraulic motor control valve 96 is also hydraulically coupled to motor 94, and movement of control valve arm 98 to its farthest limit of movement in the direction of loading end 28 of the boom adjusts control valve 96 so that motor 94 is caused to operate in a predetermined direction.

This operation of hydraulic motor 94 is transferred by belt 76 to drive pulley 74 and to drive shaft 72. As a result, conveyor pulleys 78, 78' are caused to move so that carriage assembly 92 is moved over track members 70, 70' in a first predetermined direction to convey pipeline section 32 from loading end 28 to unloading end 26 of boom 24.

Carriage assembly 92, carrying pipeline section 32, continues to move over tracks 70, 70' of the boom until the carriage assembly strikes second control means 38. The carriage assembly moves against control member 104 which, in turn, moves bar 106 and control valve arm 98 in a direction toward unloading end 26 of the boom. This movement of control valve arm 98 acts on control valve 96 to stop movement of hydraulic motor 94. This, in turn, stops rotation of drive pulley 74, drive shaft 72 and conveyor pulleys 78, 78'. As a result, endless cables 88, 88' also cease movement, and carriage assembly 92 comes to a sudden stop.

The inertia of pipeline section 32, which is carried by carriage assembly 92, causes the pipeline section to be thrown from the carriage assembly and onto ramp members 110, 110'. Pipeline section 32 then rolls and/or slides down ramp members 110,110', and the pipeline section strikes third control member 114. Hinged control member 114 rotates downwardly as the pipeline section moves over it, and wheel member 120 moves against wheel member 116. As a result, bar 106 is caused to move in a direction toward unloading end 26 of the boom, and this causes control valve arm 98 to be rotated in a direction toward unloading end 26. Control valve 96 is controlled by movement of control valve arm 98, and hydraulic motor 94 is reenergized to cause movement of conveyor pulleys 78, 78' and endless cables 88, 88' in a direction to move carriage assembly 92 back toward loading end 28 of the boom.

As pipeline section 32 passes over control member 114, spring 118 returns control member 114 to its normally upright position. The pipeline section continues to move downwardly over guide members 108, 108', and as the pipeline section drops from guide members 108, 108' riser portion 48 of the pipeline section contacts rod 168 so that riser 48 is in an upright position as the pipeline section strikes the ground.

As the pipeline section is moving over ramps 110, 110' and guide members 108, 108', carriage assembly 92 is already moving back toward loading end 28 of the boom to receive the next pipeline section.

As carriage assembly 92 approaches loading end 28 of the boom, pipeline section support 154 strikes bracket member 164. This causes a tightening of control cable 102 which results in rotational movement of control valve arm 98 in a direction toward loading end 28 of the boom. This repositioning of control valve arm 98 changes the condition of control valve 96 so as to stop operation of hydraulic motor 94. This, in turn, stops movement of conveyor pulleys 78, 78' and endless cables 88, 88'. As a result, carriage assembly 92 ceases movement, and the carriage assembly is now repositioned adjacent to loading end 28 of the boom for receiving another pipeline section.

Vehicle 22 is preferably provided with caster wheels 54 at the forward end thereof to facilitate maneuverability of the vehicle. All four tires mounted on vehicle 22 are also preferably balloon tires which distribute the weight of the vehicle to prevent it sinking into wet ground.

Hitch means 50 enable the tractor or other towing vehicle to be positioned to either side of vehicle 22. This enables the tractor to ride on dry ground and to avoid that area of the ground previously irrigated.

The apparatus described provides a rapid and efficient means for transferring irrigation pipeline sections. After the man positioned at the loading end of the boom manually initiates operation of the apparatus, the apparatus operates completely automatically to transfer the pipeline section and to return the carriage assembly to the loading end to receive another pipeline section.

The invention in its broader aspects is not limited to the specific details shown or described, and departures may be made from such details without departing from the principles of the invention and without sacrificing its chief advantages.

What is claimed is:

1. Apparatus for transferring a sprinkler irrigation pipeline section laterally with respect to the pipeline from a first position to a second position, comprising;
    a wheeled vehicle;
    a boom rotatably mounted adjacent a first end of said boom on said vehicle and said boom extending outwardly from said vehicle to define a second end of said boom;
    conveying means supported by said boom for conveying said pipeline section in said lateral direction from said second end to said first end of said boom;
    means in operative relationship with said conveying means for operating said conveying means;
    first control means mounted adjacent said second end and in operative relationship with said operating means for selectively enabling initiation of movement of said conveying means in a first predetermined direction to convey said pipeline section from said second to said first end of said boom;
    second control means mounted adjacent said first end and in operative relationship with said operating means to control operation thereof and positioned to be physically contacted and moved by a predetermined portion of said conveying means to cause cessation of movement of said conveying means;
    ramp means mounted adjacent said first end and in operative relationship with said conveying means for receiving said pipeline section from said conveying means upon said cessation of movement of said conveying means and for guiding said section to the ground;
    third control means in operative relationship with said operating means to control operation thereof and positioned adjacent said ramp means to be physically contacted by said pipeline section as said section moves downwardly along said ramp means for initiating movement of said conveying means in a second predetermined direction opposite to said first direction; and wherein
    said first control means is positioned to be physically contacted by a predetermined portion of said conveying means as said portion approaches said second end and for causing cessation of movement of said conveying means.

2. Apparatus as in claim 1 wherein said vehicle includes means mounted on said vehicle and adjacent said first end for engaging a sprinkler riser portion of said pipeline section as said section moves downwardly off said ramp means for causing said pipeline section to rotate substantially about its own axis whereby said riser portion is in an upright position as said pipeline section falls to the ground.

3. Apparatus as in claim 2 wherein said vehicle further includes hitch means for connecting said vehicle to another self-propelled towing vehicle, such as a tractor.

4. Apparatus as in claim 3 wherein said hitch means include structural means extending laterally with respect to said wheeled vehicle for enabling attachment of said self-propelled towing vehicle to said hitch means in a position laterally offset with respect to said wheeled vehicle.

5. Apparatus as in claim 4 wherein said wheeled vehicle includes caster wheels at the forward end of said wheeled vehicle.

6. Apparatus as in claim 2 wherein said wheeled vehicle further includes frame members connected together to define a substantially rectangular frame assembly; supporting wheels attached to said frame assembly; and turntable track members connected to said frame assembly.

7. Apparatus as in claim 6 wherein said boom includes first and second structural support members positioned in substantially parallel relationship with each other at and adjacent said first end; brace members connected between said first and second support members; and rollers attached at predetermined locations to said first and second support members and positioned to rest on said turntable track members.

8. Apparatus as in claim 7 wherein said boom further includes a plurality of additional support members connected to and in structurally supporting relationship with said first and second support members and with said brace members; and first and second substantially parallel conveying track members supported by said additional support members and extending in substantially inverted v-shaped configurations between said first and second ends of said boom.

9. Apparatus as in claim 8 wherein said conveying means include a drive shaft rotatably mounted on said boom and adjacent said first end; a drive pulley fixedly attached to said shaft and connected in operative relationship to said operating means to be rotated by said operating means; first and second conveyor pulleys fixedly mounted on said shaft; first and second idler pulleys mounted on said boom adjacent said second end; additional idler pulleys mounted on said boom adjacent the apex of said inverted v-shaped conveying track members and at other predetermined locations on said boom; a first endless cable mounted on said first conveyor pulley, extending around said first idler pulley and supported by predetermined ones of said additional idler pulleys; a second endless cable mounted on said second conveyor pulley, extending around said second idler pulley and supported by predetermined ones of said additional idler pulleys; means in operative relationship with said cables for maintaining said cables under predetermined tensions; and a pipeline section carriage assembly attached to said first and second endless cables and positioned to support said pipeline section above said conveying track members.

10. Apparatus as in claim 9 wherein said operating means include a hydraulic motor mounted on said boom adjacent said first end;
a hydraulic control valve mounted on said boom adjacent said first end and in operative relationship with said hydraulic motor to control operation of said motor; and a control valve arm connected in operative relationship with said control valve to control operation of said valve.

11. Apparatus as in claim 10 wherein said first control means include a first manually operated member and a first control cable connected between said manually operated member and said control valve arm.

12. Apparatus as in claim 11 wherein said second control means include a second control member rigidly connected to said control valve arm and positioned between said conveying track members with a portion of said second control member projecting upwardly and above said conveying track members to enable physical contact and movement of said second control member by said carriage assembly.

13. Apparatus as in claim 12 wherein said ramp means include first and second guide members attached, respectively, to said first and second conveying track members, and first and second wedge-shaped ramp members attached, respectively, to the upper portions of said first and second conveying track members and aligned, respectively, with said first and second guide members to provide substantially continuous downwardly sloped ramp surfaces for directing said pipeline section downwardly toward the ground.

14. Apparatus as in claim 13 wherein said third control means include a third control member positioned between said ramp members, rotatably attached to said boom and normally projecting upwardly and above said ramp members to enable physical contact and rotational movement of said third control member by said pipeline section as said section slides downwardly on said ramp members.

15. Apparatus as in claim 14 wherein said third control means further include a first freely rotatable wheel member rigidly connected to said control valve arm and positioned to be contacted and moved by said third control member when said third control member is contacted and rotated by said pipeline section, thereby moving said control valve arm and initiating movement of said conveying means in said second predetermined direction.

16. Apparatus as in claim 15 wherein said third control means further include a first spring connected between said third control member and one of said brace members for normally maintaining said third control member in said upwardly projecting position above said ramp members.

17. Apparatus as in claim 16 wherein said third control member includes a second freely rotatable wheel member positioned to rotatably contact said first wheel member when said third control member is contacted and rotated by said pipeline section, whereby said contact of said wheel members causes movement of said control valve arm to a position which initiates movement of said conveying means in said second predetermined direction.

18. Apparatus as in claim 17 further including a second spring connected to said control valve arm and extending toward said first end and connected to one of said brace members for normally biasing said control valve arm toward said first end.

19. Apparatus as in claim 18 further including means in operative relationship with said wheeled vehicle and with said boom for locking said boom into predetermined positions with respect to said wheeled vehicle.

20. Apparatus as in claim 19 wherein said pipeline section carriage assembly includes: a carriage shaft; carriage wheels rotatably mounted at either end of said carriage shaft and rotatably resting on said conveying track members; each of said wheels defining flanged portions for maintaining said carriage wheels on said conveying track members; first and second bracket members mounted on said carriage shaft and respectively attached to said first and second endless cables; and a pipeline section support mounted on said bracket members and extending in substantially parallel relationship with respect to said carriage shaft.

21. Apparatus as in claim 20 wherein said first control means further include a handlebar rotatably attached to said boom and attached to said first control cable; and a third bracket member attached to said handlebar and projecting to a location between said conveying track members to enable said third bracket member to be physically contacted and moved by said predetermined portion of said conveying means as said portion approaches said second end to cause rotational movement of said handlebar in a direction away from said second end and to cause tightening of said first control cable and movement of said control valve arm in a direction to cause cessation of movement of said conveying means.

22. Apparatus as in claim 21 wherein said vehicle further includes hitch means for connecting said vehicle to another self-propelled towing vehicle, such as a tractor.

23. Apparatus as in claim 22 wherein said hitch means includes structural means extending laterally with respect to said wheeled vehicle for enabling attachment of said self-propelled towing vehicle to said hitch means in a position laterally offset with respect to said wheeled vehicle.

24. Apparatus as in claim 23 wherein said wheeled vehicle includes caster wheels at the forward end of said wheeled vehicle.

25. Apparatus as in claim 24 further including counterweights mounted on said boom and adjacent said first end.

26. Apparatus as in claim 25 wherein said sprinkler riser engaging means includes extendable rod means for extending during use for engaging said riser portion of said pipeline section and for retracting when not in use.

27. Apparatus as in claim 23 wherein said wheeled vehicle defines a forwardly extending tongue assembly defining a first pin-receiving opening and wherein said structural means include a first laterally extending support bar defining second and third pin-receiving openings at the ends thereof; a second laterally extending support bar defining open sleeve members at each end thereof and at the center portion thereof for slidably receiving said first support bar within said sleeve members; said sleeve member at the center portion of said second support bar defining a fourth pin-receiving opening; forwardly extending members connected to said second support bar for connecting said hitch means to said self-propelled towing vehicle; a first pin extending through said first and second pin-receiving openings; and a second pin extending through said third and fourth pin-receiving openings.

28. Apparatus as in claim 4 wherein said wheeled vehicle defines a forwardly extending tongue assembly defining a first pin-receiving opening and wherein said structural means include a first laterally extending support bar defining second and third pin-receiving openings at the ends thereof; a second laterally extending support bar defining open sleeve members at each end thereof and at the center portion thereof for slidably receiving said first support bar within said sleeve members; said sleeve member at the center portion of said second support bar defining a fourth pin-receiving opening; forwardly extending members connected to said second support bar for connecting said hitch means to said self-propelled towing vehicle; a first pin extending through said first and second pin-receiving openings; and a second pin extending through said third and fourth pin-receiving openings.

* * * * *